United States Patent [19]

Palm

[11] Patent Number: 4,849,203
[45] Date of Patent: * Jul. 18, 1989

[54] SULFUR RECOVERY PLANT AND PROCESS USING OXYGEN

[75] Inventor: John W. Palm, Tulsa, Okla.

[73] Assignee: Amoco Corporation, Chicago, Ill.

[*] Notice: The portion of the term of this patent subsequent to Jan. 17, 2006 has been disclaimed.

[21] Appl. No.: 244,197

[22] Filed: Sep. 14, 1988

Related U.S. Application Data

[63] Continuation of Ser. No. 134,574, Dec. 7, 1987, , which is a continuation of Ser. No. 957,009, Apr. 29, 1986, abandoned, which is a continuation of Ser. No. 605,498, Apr. 30, 1984, abandoned.

[51] Int. Cl.$^4$ .............................................. C01B 17/04
[52] U.S. Cl. ................................................ 423/574 R
[58] Field of Search ................................... 423/574 R

[56] References Cited

U.S. PATENT DOCUMENTS

| | | | |
|---|---|---|---|
| 3,681,024 | 8/1972 | Hujsak et al. | 423/574 R |
| 3,752,877 | 8/1973 | Beavon | 423/244 A |
| 3,822,341 | 7/1974 | Smith | 423/574 R |
| 3,851,050 | 11/1974 | Groenendaal et al. | 423/574 R |
| 4,138,473 | 2/1979 | Gieck | 423/574 R |
| 4,153,674 | 5/1979 | Verloop et al. | 423/574 R |
| 4,406,873 | 9/1983 | Beavon | 423/574 R |
| 4,426,369 | 1/1984 | Palm | 423/574 R |
| 4,430,317 | 2/1984 | Reed et al. | 423/574 R |
| 4,479,928 | 10/1984 | Voirin | 423/574 R |
| 4,508,699 | 4/1985 | Schoofs | 423/574 R |
| 4,605,546 | 8/1986 | Voirin | 423/574 R |

FOREIGN PATENT DOCUMENTS

| | | | |
|---|---|---|---|
| 567085 | 12/1958 | Canada | 423/574 R |
| 2501557 | 7/1976 | Fed. Rep. of Germany | 423/574 R |
| 2708012 | 9/1977 | Fed. Rep. of Germany | 423/574 R |
| 7507553 | 12/1976 | Netherlands | 423/574 R |
| 716244 | 9/1954 | United Kingdom | 423/574 R |

*Primary Examiner*—John Doll
*Assistant Examiner*—Wayne A. Langel
*Attorney, Agent, or Firm*—L. Wayne White; Fred E. Hook; Gary M. Bond

[57] ABSTRACT

Oxygen enriched gas to Claus furnace or catalytic reactor is diluted with a process derived dilute $H_2S$ or $SO_2$ stream to prevent excessie temperature rise due to use of the oxygen enriched gas.

6 Claims, No Drawings

SULFUR RECOVERY PLANT AND PROCESS USING OXYGEN

This is a continuation of copending application Ser. No. 134,574 filed Dec. 7, 1987, U.S. Pat. No. 4,798,716, which is a continuation of Ser. No. 857,009 filed Apr. 29, 1986, abandoned, which is a continuation of Ser. No. 605,498 filed Apr. 30, 1984, abandoned.

FIELD OF THE INVENTION

The invention relates to recovery of elemental sulfur from hydrogen sulfide containing gas streams. In a particular aspect, the invention relates to such recovery of elemental sulfur utilizing the Claus reaction in which pure oxygen or oxygen enriched air is introduced into the thermal reaction zone (Claus furnace).

BACKGROUND OF THE INVENTION

The conventional thermal and catalytic Claus process for sulfur recovery from hydrogen sulfide ($H_2S$) containing gas streams is widely practiced and accounts for a major portion of total production of sulfur. In a Claus process sulfur recovery unit, the first step is the thermal oxidation of a fraction of $H_2S$ in the acid gas feed to sulfur dioxide ($SO_2$). This is typically carried out in the thermal reaction zone (Claus furnace) by the addition of air to acid gas which contains mainly $H_2S$ but may also contain carbon dioxide ($CO_2$), and possibly hydrocarbons. In this oxidation step, in addition to $SO_2$, the products also include elemental sulfur and water. The Claus reaction, shown below, can then be continued in downstream catalytic reactors having an effective Claus catalyst. The conversion achieved in each reactor is equilibrium limited. Typical reactions occurring in such sulfur recovery processes can be summarized by the following equations:

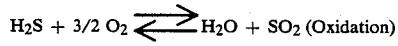
$$H_2S + 3/2\, O_2 \rightleftharpoons H_2O + SO_2 \quad \text{(Oxidation)} \tag{1}$$

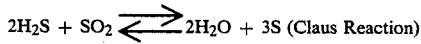
$$2H_2S + SO_2 \rightleftharpoons 2H_2O + 3S \quad \text{(Claus Reaction)} \tag{2}$$

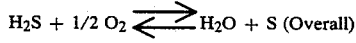
$$H_2S + 1/2\, O_2 \rightleftharpoons H_2O + S \quad \text{(Overall)} \tag{3}$$

The use of air as the source of elemental or free oxygen in the thermal reactor introduces large quantities of nitrogen ($N_2$) into the process. Equipment must be sized to handle this volume of inert gas. By increasing the concentration of oxygen in the oxygen source, the quantity of nitrogen which must be processed can be reduced. Such oxygen enrichment can significantly increase the capacity of an existing sulfur recovery unit and/or reduce the capital investment for a new unit.

The acid gas feed to the sulfur recovery unit may come from a variety of sources. Some of these acid gas streams are almost pure hydrogen sulfide (on a dry basis), but others have a high concentration of inert components, which can be carbon dioxide, for example. If the ratio of inert component (such as carbon dioxide) to hydrogen sulfide is greater than about 1/1, then the flame temperature in the thermal reaction zone is reduced and approaches a zone of unstable combustion. Special design methods have been used to handle these acid gas streams, such as the split flow sulfur recovery process, but this can cause operating problems and is not satisfactory for very high ratios of carbon dioxide/hydrogen sulfide, such as 5/1 or higher. An ideal solution is to use enriched air or a high concentration oxygen stream instead of air. This solves the problem of stabilizing the flame because eliminating or substantially reducing the nitrogen rate to the thermal reaction zone causes an increase in temperature that stabilizes the flame. In this case, the flame temperature in the thermal reaction zone will be satisfactory but the temperature rise in the downstream catalytic reactors may be too high; however, this problem can be solved by the process of this invention. Further, with either a low $CO_2$ acid gas or a high $CO_2$ acid gas, if industrial grade oxygen or enriched air is used instead of air, the nitrogen can be substantially eliminated from the feed gas to the furnace and, therefore, substantially eliminated from the tail gas. This can reduce the amount of tail gas and make it possible to increase conversion to sulfur and also to reduce emissions. However, there are problems caused by using pure oxygen, such as a very high temperature rise in the thermal reactor or reaction furnace, and a very high temperature rise in the downstream catalytic reactors. Such temperature rise can exceed the metallurgical limits of conventional thermal reactors and can be of such an extent as to damage the downstream catalytic reactors.

In the past this type of process has not been attractive economically in some locations because of the high cost or nonavailability of the oxygen or enriched air stream. With the advent of nitrogen injection facilities for use in some oil reservoirs, for example, there are now a larger number of locations where a stream of enriched oxygen in air may be made available for beneficial use in this process. Other sources of pure oxygen can of course also be used.

Giech, U.S. Pat. No. 4,138,473 (1979) deals with a sulfur recovery process using pure oxygen for combusting the feed gas rather than air as in conventional Claus processing. A mixture of $H_2S$ and $SO_2$ is thus produced, which is reacted successively over a series of catalytic converter beds wherein they react to produce water and elemental sulfur, the elemental sulfur being condensed after each converter, and the gaseous output of each converter being repressurized and reheated before entering the next successive converter to improve the yield of sulfur therein. The gaseous output of the final converter of the series is combusted with oxygen in a final catalytic converter to convert any remaining $H_2S$ to $SO_2$. The $H_2O$, $SO_2$ and $CO_2$ mixture emerging from said converter is treated to remove therefrom as separate streams the water, the $CO_2$, and the $SO_2$. A concentrated $SO_2$ stream is returned to the beginning step of the process. The $SO_2$ and water are separated from the $CO_2$ by contacting the combined stream with cold water. The $CO_2$ which is only partly soluble in water is removed overhead. The cold water containing absorbed water and $SO_2$ is sent to a stripper where it is heated to remove the $SO_2$. $SO_2$ stripped from the water, together with steam, flows from the stripper to a condenser where steam is condensed and the $SO_2$ is returned to the beginning step of the process. In this way, pure oxygen can be used to combust the acid gas; however, Giech is silent as to the problem of moderating the temperature rise in the combustion zone when pure oxygen is used and also in downstream catalytic converters. Furthermore, this process requires a large amount of water to absorb the $SO_2$ and also requires heat input in the SO₂ stripper sufficient to drive the $SO_2$ overhead.

Accordingly, it is desirable to achieve the advantages of operation with oxygen enriched air or substantially pure oxygen in a Claus plant thermal reaction zone while avoiding the undesirable temperature rise which can result from such use.

SUMMARY OF THE INVENTION

According to the invention, a process and apparatus for the recovery of sulfur from a gaseous stream comprising hydrogen sulfide or mixtures of hydrogen sulfide with other gases including carbon dioxide introduces substantially pure oxygen into the thermal reaction zone with an internal process-derived gaseous stream containing a diluent such as, for example, carbon dioxide. The diluent containing stream is returned to the thermal reaction zone in an amount effective to prevent the temperature rise from exceeding equipment limitations.

In accordance with the invention, a process is provided for the recovery of sulfur from a gaseous stream comprising hydrogen sulfide or mixtures of hydrogen sulfide with other gases, including carbon dioxide. The gaseous stream comprising hydrogen sulfide is introduced into a combustion zone of a Claus thermal reactor (furnace) together with free oxygen ($O_2$) and an internally process-derived stream containing a diluent gas, forming a thermal reaction mixture. In the absence of the diluent in process-derived diluent stream, the combustion of the thermal reaction mixture would cause temperatures of the thermal reaction zone (combustion zone) to be in excess of metallurgical limits of conventional equipment. The thermal reaction mixture is combusted in the combustion zone of the Claus thermal reactor, producing hot combustion gases comprising $H_2S$, $SO_2$, and elemental sulfur. The hot combustion gases can then be cooled and elemental sulfur recovered therefrom and/or introduced into one or more Claus catalytic reaction zones where $H_2S$ and $SO_2$ are further reacted by the Claus reaction to further produce elemental sulfur and water. After cooling and condensing elemental sulfur from the catalytic reactor effluent streams, a Claus plant gaseous effluent stream is produced comprising $H_2S$, $SO_2$, $CO_2$, $H_2O$, and residual sulfur. Other sulfur species may also be present. The next step is to remove at least a portion of the water vapor from the Claus plant gaseous effluent stream to furnish a stream suitable for use as the diluent stream to the thermal reactor. However, cooling would cause water to condense, and when liquid water is present with a mixture of sulfur species, undesirable side reactions occur. Also, solid sulfur would form and would cause plugging problems. To provide a solution to this problem, at least part of the Claus plant gaseous effluent stream can be treated to convert substantially all of the sulfur species in this portion to a single sulfur species selected from the group consisting of $H_2S$ and $SO_2$. The resulting single sulfur species stream can then be subjected to conditions effective for removing water from such stream and a stream of reduced water content containing, for example, $CO_2$ as diluent and the single sulfur species produced. This partially dried stream can then be returned as diluent to the combustion zone of the Claus furnace to permit operation of the Claus plant utilizing pure oxygen, thereby achieving many of the advantages of such operation, while avoiding disadvantages resulting from unmoderated temperature rise, and at the same time causing an increased level of recovery due to the return of the sulfur species.

In a further aspect, the resulting single sulfur species stream is dried by contacting with cooled water substantially saturated with the single sulfur species. The preponderance of the water in the single sulfur species stream can thus be condensed and removed while there is no significant net absorption of the single sulfur species. This operation requires a minimum amount of water circulation because the gas needs to be cooled only enough to condense part of its water content and the larger amount of water which would be required to dissolve the single sulfur species is not necessary. Energy consumption can be reduced because most of the water stream used in a quench tower to cool the single species gas is merely cooled and returned to the quench tower, and need not be stripped to remove the single sulfur species. A portion of the water stream from the quench tower representing predominantly water formed in the process by the Claus reaction can be removed. If desired, this portion of the aqueous stream can be provided to a stripper and a gaseous stream comprising the single sulfur species can be produced which is returned, combined with the single sulfur species stream, to the water removal zone.

In a further aspect, the invention comprises apparatus for the recovery of sulfur. The apparatus comprises a Claus thermal reaction means having a combustion zone for receiving a gaseous stream comprising $H_2S$, $O_2$, and a process derived diluent containing stream of reduced water content comprising a single sulfur species and for combusting and producing hot combustion gases comprising $H_2S$, $SO_2$, and elemental sulfur. Downstream of the Claus thermal reaction means is Claus catalytic recovery means connected in flow communication with the Claus thermal reaction means for receiving a product stream comprising at least $H_2S$ and $SO_2$ therefrom, and for further producing and recovering elemental sulfur by Claus reaction in the presence of an effective Claus catalyst followed by sulfur condensation, and for producing a Claus plant effluent stream comprising $H_2S$, $SO_2$, $CO_2$, and residual elemental sulfur. Part of the Claus plant effluent stream can be removed from the process. The remaining portion is provided to conversion means in flow communication with the Claus catalytic recovery means for converting essentially all sulfur species in this portion of the Claus plant effluent stream to a species selected from the group consisting of $H_2S$ and $SO_2$. The resulting single sulfur species recycle stream can then be provided in flow communication with an inlet to water removal means for removing water produced during the Claus reaction or present in the gaseous feed stream, and for producing a process-derived diluent containing stream of reduced water content comprising the single sulfur species and $CO_2$. The diluent stream can be removed from a gaseous outlet of the water removal means and can be returned to the Claus thermal reaction means by diluent return means. The water removal means can be a contacting means for contacting the single sulfur species recycle stream with a cooled aqueous stream substantially saturated with the single sulfur species, condensing water therefrom, and for producing a dried single sulfur species stream containing the diluent gas and an aqueous stream comprising the removed water.

According to a further aspect of the invention, at least a portion of the aqueous stream representing the removed water can be removed from the process and can be provided in flow communication with a stripper means for producing a single sulfur species recycle stream and a purified water stream. The single sulfur species stream can be provided in flow communication with the inlet to the water removal means.

According to a further aspect of the invention, at least a portion of the process derived diluent containing stream can be returned to the inlet of at least one of the catalytic converters. As pointed out under Background of the Invention, using a high oxygen concentration gas instead of air can increase the temperature rise in the furnace (thermal reactor) of the Claus plant and can also increase the temperature rise in the Claus catalytic reactors. The effect in each piece of equipment can be readily calculated by the skilled designer of sulfur recovery facilities and is principally a function of the composition of the acid gas and diluent gas streams to the furnace. If the single sulfur species component of the diluent stream is hydrogen sulfide, then the temperature rise in the thermal reactor will be high and, if desired, all of the diluent stream can be recycled to the thermal reactor to reduce its temperature rise. If sulfur dioxide is the single sulfur species component in the recycled diluent stream, then the thermal reactor temperature rise will be reduced but the temperature rise in catalytic reactors will not be substantially reduced. In this case, if desired, a first portion of the recycle diluent stream can be fed to the thermal reactor and the remaining portion can be fed to a Claus catalytic reactor, normally the first one in series. Control valves can be used to control flow of diluent gas to each point.

BRIEF DESCRIPTION OF THE DRAWING

The invention will be further understood and appreciated from the following detailed description and from FIG. 1 which illustrates a preferred embodiment of the invention.

DETAILED DESCRIPTION OF THE INVENTION

According to the invention, oxygen or oxygen-enriched air is introduced into the thermal reaction zone of a Claus sulfur recovery plant for oxidizing $H_2S$ to $SO_2$. A portion of the effluent stream from the Claus plant can be treated to remove water, typically present in the range of 20-40% by volume of the effluent stream, and a diluent stream comprising predominantly $CO_2$ and optionally some nitrogen ($N_2$), but substantially free of $H_2O$, can be recycled to the thermal reaction zone to dilute the oxygen and prevent excessive temperature rise in the Claus thermal reaction zone or in downstream Claus catalytic reaction zones. The process derived diluent stream can also be recycled to one or more of the Claus catalytic reactors to further reduce temperature rise therein.

An acid gas stream containing hydrogen sulfide can be introduced by line 10 into Claus thermal reaction zone (furnace) 12 and combusted in the presence of free oxygen, supplied, for example, by lines 8 and 14 from a source of high concentration oxygen. A diluent stream is fed through lines 6 and 14. Combustion of $H_2S$ can preferably be carried out at a thermal reaction temperature in the range of about 2000~F. to about 2600~F. The lower limit is determined by the declining reaction rate for the Oxidation Reaction (1) below as temperature is reduced, while the upper limit is primarily a practical matter and determined by the higher cost of construction materials as the temperature is increased. In this regard, the economic temperature limits of conventional furnace metallurgical and refractory construction materials is about 2600~F.

A diluent stream derived from the process, as hereinafter described, can be introduced with the free oxygen stream at a rate effective for diluting the oxygen concentration to a level where the heat of combustion in the thermal reaction zone is such as to maintain the temperature therein below about 2600~F., preferably in the range of about 2000~F. to about 2400~F. The rate of introduction can be readily determined by a person skilled in the sulfur recovery arts for particular feed stream compositions, rates, and the like in accordance with the invention.

Reactions involving $H_2S$ occurring in the thermal reaction furnace 12 can include the following:

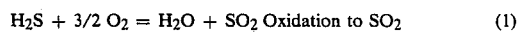

$$H_2S + 3/2\, O_2 = H_2O + SO_2 \text{ Oxidation to } SO_2 \quad (1)$$

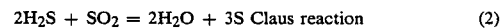

$$2H_2S + SO_2 = 2H_2O + 3S \text{ Claus reaction} \quad (2)$$

Molecular oxygen can be introduced by line 8 corresponding to about 0.5 mols $O_2$ per mole of hydrogen sulfide, and such additional $O_2$ as may be required to oxidize other combustible components in the furnace feed gas, such as, for example, hydrocarbons, ammonia, and the like. Combustion in the thermal reaction zone (furnace) results in a hot reaction mixture which contains unconverted reactants, such as $H_2S$, as well as products such as sulfur dioxide, elemental sulfur, water, hydrogen, nitrogen, carbon sulfides, carbon oxides, and the like.

The Claus thermal reaction furnace for carrying out the oxidation of hydrogen sulfide represented by the above reactions can be, for example, of the fire tube or muffle furnace type. In the illustrated embodiment, the muffle furnace type is shown. The process of the invention can generally be carried out by using a furnace comprising a single combustion zone if the feed gases do not contain unusual material such as ammonia. Special furnace configurations can be used if required when the feed gases contain significant concentrations of ammonia, such as, by use of a two-zone furnace. From the above discussion, it will be apparent that various combustion arrangements can be used in accordance with the invention. In each instance, however, oxygen is introduced in an amount roughly equal to the sum of about 0.5 moles oxygen for each mole of hydrogen sulfide and, for example, about 0.5 moles to about 2.0 moles oxygen per mole methane, or corresponding stoichiometric ratios for other hydrocarbons or oxidizable materials, introduced into the thermal reaction zone. Appropriate molar ratios of oxygen to hydrocarbon gas for fuel compositions other than methane can be readily determined. The free oxygen is introduced with a diluent stream normally comprising $CO_2$ or $N_2$ as the predominant component and either $H_2S$ or $SO_2$ as the predominant sulfur species. In the event that $SO_2$ is provided as a diluent, then the $O_2$ supply can be reduced accordingly; similarly, where $H_2S$ is returned as a diluent $O_2$ rate can be increased accordingly. Such calculations can be readily performed by persons skilled in the sulfur recovery arts.

The rate of diluent introduction is selected to provide against excessive temperature rises in the thermal reaction zones and in the Claus catalytic reaction zones hereinafter described. The diluent may be fed to the thermal reaction zone and/or to a Claus catalytic reaction zone. Diluent control to one or both points can be automated using a temperature control system to maintain all temperature control points at the proper temperature.

Thus, in the illustrated embodiment, a muffle furnace 12, having an associated waste heat boiler 16, can be utilized as the Claus thermal reaction zone. The hot reaction product stream, after cooling in waste heat boiler 16, can be removed by line 18 and cooled in condenser 20 (C-1) to condense and remove elemental sulfur. The sulfur depleted effluent stream can then be provided by lines 22 and 26 to Claus catalytic conversion zone 28 (R-1). In the illustrated embodiment, a portion of hot effluent can be removed by line 24 having temperature controlled valve 24V from waste heat boiler 16 at an elevated temperature, for example, at about 1100~F. (595~C.) after a single pass through the waste heat boiler and can be mixed with stream 22, thus reheating the sulfur-depleted stream to provide a heated process stream in line 26 which can be provided to the first Claus catalytc conversion reactor 28. Other methods of reheat can, of course, also be used.

In the illustrated embodiment, two Claus catalytic reactors are utilized. It will be appreciated that one or even three or more Claus catalytic reactors can be utilized. Each Claus catalytic reactor can be followed by a sulfur condenser for the recovery of elemental sulfur. The reactor(s) can contain catalyst effective to facilitate the Claus reaction (2) stated above, and also to facilitate carbonyl sulfide (COS) and carbon disulfide ($CS_2$) decomposition if such are present. Several catalysts of the activated alumina type are commercially available which have proven to be satisfactory by reason of economy and effectiveness.

Referring to the FIGURE, the Claus catalytic conversion zone comprises a first Claus catalytic reactor 28 (R-1) into which an inlet stream is provided by line 26 at an inlet temperature above its sulfur dew point, broadly in the range of about 400~F. (204~C.) to about 550~F. (290~C.), preferably in the range of about 450~F. to about 500~F. (232 to 260~C.) Higher temperatures, for example, up to about 550~F. (290~C.) can be preferred if carbonyl sulfide or carbon disulfide are present. The inlet stream can flow through, for example, a supported bed of alumina catalyst where reaction (2) above is facilitated, and the effluent stream containing elemental sulfur, unreacted hydrogen sulfide, sulfur dioxide, and water vapor can be removed by line 30. It will be appreciated that these temperature limits set forth a preferred embodiment of the invention, but should not be considered to limit the invention. Recycle of the process derived diluent stream can thus be used to achieve temperatures of operation outside of the stated preferred ranges.

The Claus reaction, represented by (2) above, is a highly exothermic reaction, and in the absence of diluent which can absorb at least a portion of the heat produced, the temperature rise in the Claus catalytic reactors can cause the temperature to exceed the range which is economically acceptable for common materials of construction. Thus, for example, carbon steel becomes uneconomical if the effluent temperature from the reactor exceeds about 625–675~F. In accordance with the invention, therefore, the amount of diluent recycled by line 64, as hereinafter described, is preferably selected to provide an adequate amount of diluent to prevent temperature rise in the Claus catalytic reactors from reaching the point where more expensive construction materials would be required.

Typically the rate of total diluent fed in line 64 will be about 1 to 6 times the rate of molecular oxygen in line 8. If none of the diluent in line 64 is fed through to reactor 28 (R-1), for example, by line 65 having valve 65V, but is all fed to the thermal reactor 12 through lines 6 and 14, then this results in an $O_2$ concentration in the diluted oxygen line 14 of about 14–50 mol %, which is similar to or higher than the concentration of oxygen in air. The effect of varying the diluent can be readily calculated and the designer can vary the ratio to values outside the above limits if desired. A lower diluent rate will decrease the equipment size but will cause the temperatures in the thermal reactor and catalytic reactors to increase. Although a range of about 1/1 to about 4/1 is a typical preferred value, the range for ratio of total moles of diluent to moles of $O_2$ can vary depending on acid gas composition over very wide limits, such as about 1/10 to about 10/1.

The effluent stream from first reactor 28 can be provided by line 30 to second condenser 32 (C-2) in which the effluent stream can be cooled, for example, to below about 350~F. (175~C.) and elemental sulfur can be removed, and the resulting sulfur-depleted stream from the second condenser can then be provided by line 34 to reheat exchanger 36 for heating to an effective inlet temperature for second Claus reactor 38 (R-2).

Reheat exchanger 36 can heat the effluent from second condenser 32 to an inlet temperature above its sulfur dew point, for example, to about 400~F. (205~C.) in line 37 provided to the second Claus reactor 38. The process stream can flow in contact with the catalyst in reactor 38 where reaction (2) is facilitated, and an effluent containing elemental sulfur, hydrogen sulfide, sulfur dioxide, and water vapor can be removed by line 40 and provided to third sulfur condenser 42 (C-3) where the stream can be cooled, for example, to about 260~F. (125~C.) and elemental sulfur recovered. The lean stream from the third sulfur condenser can then, if desired, be provided to a third or further Claus reactor or associated sulfur condensers (not shown) for further removal of sulfur from the effluent stream.

The effluent stream from the Claus catalytic conversion zone (Claus plant effluent stream) can be divided. A portion can be withdrawn as Claus plant tail gas through line 92, having valve 92V, which usually goes to a tail gas incinerator. The tail gas rate can be very small compared to a Claus plant that uses air, because it does not contain the relatively large amount of nitrogen that would be present in air. The remaining portion of the Claus plant effluent stream can be removed, for example, by line 44 and provided to a conversion zone where substantially all of the sulfur compounds present can be converted to either hydrogen sulfide or sulfur dioxide. Such Claus plant effluent streams can include, for example, hydrogen sulfide in the range of about 0.4 to about 4 mole percent, sulfur dioxide in the range of about 0.2 to about 2 mole percent, water in the range of about 20 to about 50 mole percent, organic sulfides such as carbonyl sulfide and carbon disulfide, and elemental sulfur. Claus plant effluent streams having compositions not represented by these ranges may, of course, also result.

In accordance with the invention, the sulfurcontaining compounds in the Claus plant gaseous effluent stream can be converted to hydrogen sulfide. In this instance, the reactor 50 (R-3) will be a hydrogenation reactor. The hydrogenation zone can be either catalytic or noncatalytic, although a catalytic hydrogenation zone is preferred. Useful catalysts are those containing metals of Groups VB, VIB, VIII and the Rare Earth Series of the Periodic Table of the Elements, as published in Perry, *Chemicals Engineers Handbook*, Fifth Edition, 1973. The catalyst may be supported or unsupported, although catalysts supported on a silica, alumina, or silicaalumina base are preferred. The preferred catalysts are those containing one or more of the metals cobalt, molybdenum, iron, chromium, vanadium, thorium, nickel, tungsten, and uranium. Particularly preferred are standard cobalt-molybdenum type hydrogenation catalysts as are used in hydrodesulfurization processes in refineries, for example, United Catalysts' Type C29-2 available from United Catalysts, Inc., Louisville, Ky. 40232.

The reducing equivalents, hydrogen and carbon monoxide, necessary for converting sulfur-containing compounds to hydrogen sulfide in the hydrogenation zone are present to a limited extent within the Claus plant effluent stream, and it is expected that generally sufficient reducing equivalents will be present to accomplish the hydrogenation to hydrogen sulfide. If the concentration of sulfur dioxide, sulfur or other compounds to be hydrogenated exceeds the available hydrogen and carbon monoxide equivalents, additional equivalents can be provided to the reactor from an external source, such as, for example, a reducing gas generator or the like.

The hydrogenation zone can be operated at a temperature in the range of about 450~F. (230~C.) to about 650~F. (340~C.) when a catalyst, as described above, is present. Preferably, the hydrogenation zone can be operated at a temperature from about 580~F. to about 650~F. to provide adequate initiation and conversion of the sulfurcontaining compounds to hydrogen sulfide. Thus, referring to the Figure, the portion of the Claus plant effluent in stream 44 can be provided to conversion plant preheater 46 and the heated stream can be provided by line 48 to hydrogenation reactor 50 containing, for example, a supported bed of effective hydrogenation catalyst. If hydrogen or other reducing gas is needed for the hydrogenation reaction, it can be provided to the hydrogenation reactor 50 by line 49. Substantially all sulfur compounds can be converted in reactor 50 to hydrogen sulfide and the resulting stream containing hydrogen sulfide can be removed by line 52.

Alternatively, substantially all of the sulfur-containing compounds present in the Claus plant tail gas stream can be converted in reactor 50 (R-3) to sulfur dioxide. Thus, according to the invention, the gaseous tail gas stream containing hydrogen sulfide can be subjected to oxidizing conditions effective for converting substantially all hydrogen sulfide and other sulfur species present to $SO_2$. An oxidant containing free oxygen is preferred, and can be an oxygen or enriched oxygen stream similar to the one provided in line 8 to thermal reactor 12. The oxidant can according to this embodiment be provided to reactor 50 by line 49.

According to one aspect, the gaseous stream can be subjected to such oxidizing conditions in a thermal oxidizing (combustion) zone or in a catalytic oxidizing zone. Preferably, the oxidizing zone will be a catalytic oxidizing zone to eliminate the need for the fuel required for thermal oxidizing zones, and the high temperatures typically associated with such combustion zone effluent streams.

The catalytic oxidizing zone can use an effective oxidation-promoting catalyst. Preferred are activated alumina-based catalysts which promote oxidation. Suitable catalysts can include, for example, Kaiser S-201 available from Kaiser Chemicals and CR type catalysts available from Rhone Poulenc, which are also suitable for use in Claus reactors R-1 and R-2. Other catalysts can also be used including R-301 catalyst available from Pro Catalyse which is used in sulfur plant tail gas catalytic incinerators. Such catalysts can promote oxidation at relatively low temperatures as compared with a thermal oxidation zone and can minimize undesired side reactions such as the formation of sulfur trioxide ($SO_3$) and the like. $SO_3$ can react in quench tower to form sulfuric acid, which would have to be neutralized or removed by ion exchange.

The oxidizing zone can include one or more catalytic oxidation reactors. A free oxygen-containing gas stream can be introduced with the gas stream into the oxidation reactors. It is preferred to limit the effluent temperatures from the oxidation reactors to below about 1000~F. The free oxygen, with or without a diluent, can be introduced in an amount just sufficient to oxidize hydrogen sulfide and other sulfur species present to sulfur dioxide. Formation of sulfur trioxide can be minimized by avoiding the presence of excess oxygen, for example, by reducing the amount of oxygen provided to the oxidation reactors to slightly below the stoichiometric amount.

Following conversion of all sulfur compounds to a single species, the resulting single sulfur species stream can be provided to a water removal zone in which a substantial portion of the water present in the stream is removed to provide a dried stream of reduced water content. Typically, the effluent stream of a Claus plant in which enriched oxygen is fed to the thermal reactor can contain in the range of about 30 to about 50 mole percent water, although either higher or lower amounts of water may be present depending upon the circumstances. Since water, as shown by reaction (2) above, is a reaction product of the Claus reaction, removal of water from the recycle diluent gas stream can facilitate, or at the least not interfere with, the conversion of hydrogen sulfide and sulfur dioxide to sulfur by reaction (2).

Following conversion of the sulfur-containing compounds to a single sulfur species, the resulting process steam can be provided to a water removal zone in which the process stream is cooled and water is removed therefrom. Thus, the resulting single sulfur species stream can be pressurized to the system operating pressure necessary and suited to compensate, for example, for the pressure drop of subsequent steps and to recycle the gas in stream 64, described below, to an upstream point in the process. Generally, for the preferred embodiment according to the invention as hereinafter described, it will be sufficient to pressurize the system to a pressure greater than about 5 psig, preferably in the range of about 6 psig to about 12 psig; higher or lower pressures can also be used, however, so long as an adequate flow rate is achieved in the system. The pressurization can be achieved by any suitable arrangement of pressurizing equipment, for example, compressors, blowers, and the like.

The single sulfur species stream can be cooled prior to pressurization to facilitate selection and to improve deliverability of the pressurizing equipment. In this instance, the single sulfur species containing stream can be cooled to a temperature below about 350~F. (175~C.), and most preferably in the range from about the water dew point of the single sulfur species stream to about 350~F. (175~C.) before pressurizing. Generally, for Claus plant tail gas streams having about 30 mole percent water, the single sulfur species stream should not be cooled below about 180~F. (80~C.). After cooling the single sulfur species containing stream from the conversion zone to a temperature preferably in the range of about 180~F. (80~C.) to about 350~F. (175~C.), the cooled stream can be pressurized to a effective system operating pressure as described above. Alternatively, the pressurization can occur downstream of the water removal zone.

Thus, the single sulfur species containing stream can be introduced into a water removal zone, which can, for example, comprise a contact condenser, for example, a quench tower effective for substantial temperature reduction of the stream therein. In the contact condenser, the single sulfur species containing stream can be contacted, for example, with water having a temperature in the range of about 40~F. (4~C.) to about 120~F. (50~C.) to condense and remove water from the single sulfur species containing stream.

Referring again to the Figure, effluent from the conversion zone can be provided by line 52 to cooler 54. The cooled effluent from cooler 54 in line 56 can then be pressurized by compressor 58 and provided by line 60 to quench tower 62. The pressure in line 56 can be sensed and a signal provided by line 98 to pressure controller 96 controlling valve 92V to insure an adequate supply of gas. In quench tower 62, the compressor effluent provided by line 60 can be contacted with a cooled aqueous stream provided by line 66 and water removal achieved, producing a cooled gaseous single sulfur species stream of reduced water content in line 64. The reduced water content stream in line 64 will contain the single sulfur species component and carbon dioxide together with other components including CO, $H_2$ and $N_2$, if present, and can be returned by line 6, having valve 6V, as a diluent to the Claus thermal reaction zone and/or via line 65, having valve 65V to Claus reactor 28 (R-1) and, in the event that reactor 50 (R-3) is operated as an oxidation reactor, as diluent for oxygen in line 49 to the oxidation reactor (not shown).

An aqueous stream containing a small amount of a single sulfur species can be removed from quench tower 62 by line 68, pump 70 and a filter (not shown). The first portion of this stream can then be returned to the quench tower by line 66 after cooling, for example, in exchanger 76. A second portion can be removed by line 74. In some plants, the sour water stream 74 can go to a central sour water stripper facility for removal of gaseous species. When required, the sour water stripper can be supplied as part of the sulfur recovery unit. Thus, the sour water stream 74 can be fed, for example, to sour water stripper 78.

The sour water stripper 78 (having steam provided by line 80) can produce a stripped water stream removed by line 82, suitable for use, for example, as boiler feed water, and can remove a single sulfur species gaseous stream overhead by line 88. The gaseous stream in line 88 can comprise predominantly water vapor and the single sulfur species; some carbon dioxide or other gaseous components may also be present which can also be returned by line 88 to the gas inlet to quench tower 62 as shown.

The invention will be further understood and appreciated by the following EXAMPLE calculated with reference to the Figure.

EXAMPLE

Six cases were calculated for an acid gas feed in line 10 to Claus furnace 12 comprising 67 mol % $H_2S$ and 33 mol % $CO_2$. A 95 mol % $O_2$, 5 mol % $N_2$ stream (selected as representing a realistic value for commercial operations is introduced into furnace 12 by line 8. Case 1 was calculated assuming a concentrated $SO_2$ recycle stream ("Conc. $SO_2$") (96 mol % $SO_2$, 4 mol % $H_2S$) to furnace 12 by lines 6 and 14. Case 2 was calculated assuming such a concentrated $SO_2$ recycle stream provided to only reactor 28 (R-1) by line 65. Cases 3, 4, and 5 were calculated assuming a diluted $SO_2$ ("Dil. $SO_2$") recycle stream (2 mol % $SO_2$, 4 mol % $H_2O$, 4 mol % $N_2$, 90 mol % $CO_2$) provided to furnace 12 only, reactor 28 only, or divided between furnace 12 and reactor 28, respectively. Case 6 was calculated assuming no recycle to furnace 12 in lines 6 and 14 and no recycle to reactor 28 (R-1) in line 65 and using air as a source of free oxygen instead of a free-oxygen enriched stream. The results of the calculations are set forth in the TABLE below:

TABLE

|  | Case 1 | Case 2 | Case 3 | Case 4 | Case 5[1] | Case 6 |
|---|---|---|---|---|---|---|
| Acid Gas Feed, Line 10 | 2:1 $H_2S:CO_2$ | 2:1 $H_2S:CO_2$ | 2:1 $H_2S:CO_2$ | 2:1 $H_2S:CO_2$ | 2:1 $H_2S:CO_2$ | 2:1 $H_2S:CO_2$ |
| $O_2$ Feed, Line 8 | 95% $O_2$ | 95% $O_2$ | 95% $O_2$ | 95% $O_2$ | 95% $O_2$ | Air |
| $SO_2$ Recycle Line 6 | Conc. $SO_2$ | None | Dil. $SO_2$ | None | Dil. $SO_2$ | None |
| Line 65 | None | Conc. $SO_2$ | None | Dil. $SO_2$ | Dil. $SO_2$ | None |
| Furnace 12 Effluent Temp. | 2670° F.(1465° C.) | 2800° F.(1540° C.) | 1577° F.(°C.) | 2876° F.(°C.) | 2227° F.(°C.) | 2003° F.(1095° C.) |
| Reactor 28 (R-1) Inlet Temp. | 446° F.(230° C.) | 446° F.(230° F.) | 446° F.(230° C.) | 446° F.(230° C.) | 446° F.(230° F.) | 446° F.(230° F.) |
| Effluent Temp. | 755° F.(400° C.) | 755° F.(400° C.) | 608° F.(320° C.) | 608° F.(320° C.) | 608° F.(320° C.) | 634° F.(334° C.) |
| Reactor 38 (R-2) Inlet Temp. | 401° F.(205° C.) | 401° F.(250° C.) | 401° F.(205° C.) | 401° F.(205° C.) | 401° F.(205° C.) | 401° F.(205° C.) |
| Effluent Temp. | 538° F.(280° C.) | 538° F.(240° C.) | 437° F.(225° C.) | 437° F.(225° C.) | 437° F.(225° C.) | 454° F.(234° C.) |
| Theoretical Sulfur Recovery | —[2] | — | — | — | 99.2% (99.8%)[3] | 95.5% (96%, est.)[3] |

[1] The Dilute $SO_2$ recycle stream is split 50/50 between line 6 and line 65.
[2] A dashed line indicates calculation not made.
[3] Based on 100 mol % Acid Gas Feed in line 10.

The calculations (Case 1 and Case 2) indicate that use of 95% $O_2$ for a 2:1 $H_2S:CO_2$ acid gas feed and a concentrated $SO_2$ recycle can result in temperatures in excess of 2600°F. in the furnace 12 whether the $SO_2$ recycle stream is provided to furnace 12 or to reactor 28 (R-1). The temperature in furnace 12 is indicated to be less when the concentrated $SO_2$ recycle stream is provided to furnace 12 than when provided to reactor 28 (R-1); however, in both cases furnace temperatures appear excessive. In Cases 1 and 2, reactor 28 (R-1) effluent is indicated excessive where a Concentrated $SO_2$ Recycle stream is provided either to furnace 12 or to reactor 28 (R-1). Where a dilute $SO_2$ recycle stream is utilized to furnace 12 or to reactor 28 (R-1) temperatures in that vessel to which dilute $SO_2$ recycle is provided are indicated to be reduced below excessive levels (Cases 3, 4, and 5). Comparison of Cases 5 and 6 indicates that overall sulfur recoveries can be significantly increased by use of the invention.

Although the invention has been described in terms of preferred embodiments, giving specific temperatures and other operating conditions as required, it will be appreciated that the invention is not limited thereby but by all use made of the invention as defined by the claims appended hereto.

What is claimed is:

1. Process for the recovery of sulfur from a gaseous stream containing hydrogen sulfide, said process comprising the steps of:
   (a) introducing a thermal reaction mixture comprising (1) said gaseous stream containing hydrogen sulfide, and (2) an oxygen-enriched stream of air or pure oxygen into a combustion zone of a Claus furnace;
   (b) combusting said thermal reaction mixture in said Claus furnace to thereby produce hot combustion gases comprising hydrogen sulfide, sulfur dioxide, carbon dioxide, water, and elemental sulfur;
   (c) introducing said hot combustion gases into a Claus catalytic reactor;
   (d) subjecting said hot combustion gases in said catalytic reactor to Claus reaction conditions in the presence of a Claus catalyst to thereby produce a Claus plant gaseous effluent stream comprising hydrogen sulfide, sulfur dioxide, carbon dioxide, water, and elemental sulfur;
   (e) introducing said Claus plant gaseous effluent into a condenser to thereby produce liquid sulfur, which is recovered, and a gaseous condenser effluent, which comprises hydrogen sulfide, sulfur dioxide, carbon dioxide and water and which is divided into a recycle portion and a tailgas portion;
   (f) converting substantially all sulfur species in the recycle portion of said gaseous condensor effluent to hydrogen sulfide to thereby form condenser effluent comprising hydrogen sulfide, carbon dioxide and water;
   (g) removing water from the recycle portion of said condenser effluent from step (f); and
   (h) moderating the temperature in said Claus furnace by returning at least a portion of the dried recycle condenser effluent from step (g), as a diluent stream, to a combustion zone of the Claus furnace in step (a) above.

2. Process as in claim 1 where, in the absence of providing the diluent stream, temperatures of the combustion zone are in excess of about 2600° F.

3. Process as in claim 1 wherein the ratio of total moles of diluent to moles of $O_2$ is in the range of about 1:10 to about 10:1.

4. Process as in claim 1 wherein the ratio of total moles of diluent to moles of $O_2$ is in the range of about 1:1 to about 6:1.

5. Process as in claim 1 further comprising:
   removing a stream of water from the recycle portion of condenser effluent in step (g) to a sour water stripper, thereby producing a purified water stream and a gaseous second single sulfur species stream; and
   combining the gaseous second single sulfur species stream with the single sulfur species stream from which water is removed in step (g) of claim 1.

6. Process as in claim 1 where water is removed from the condenser effluent in step (g) by contacting said recycle portion of condenser effluent with an aqueous stream under conditions such that water in the gaseous condenser effluent is condensed to a liquid and separated from the remaining gaseous components in said condenser effluent.

* * * * *